(12) United States Patent
Ruehle

(10) Patent No.: US 7,536,672 B1
(45) Date of Patent: May 19, 2009

(54) MANAGEMENT OF USER INTERACTION HISTORY WITH SOFTWARE APPLICATIONS

(75) Inventor: Glenn Warren Ruehle, Novato, CA (US)

(73) Assignee: Adobe Systems Incorporated, San Jose, CA (US)

( * ) Notice: Subject to any disclaimer, the term of this patent is extended or adjusted under 35 U.S.C. 154(b) by 890 days.

(21) Appl. No.: 10/794,173

(22) Filed: Mar. 5, 2004

(51) Int. Cl.
*G06F 9/44* (2006.01)
(52) U.S. Cl. .................. 717/101; 717/102; 717/103
(58) Field of Classification Search ......... 717/100–103, 717/120–123
See application file for complete search history.

(56) References Cited

U.S. PATENT DOCUMENTS

| | | | |
|---|---|---|---|
| 6,527,812 B1 * | 3/2003 | Bradstreet | 715/210 |
| 6,532,472 B1 * | 3/2003 | Arrouye et al. | 707/103 R |
| 7,143,392 B2 * | 11/2006 | Ii et al. | 715/771 |
| 2002/0143861 A1 * | 10/2002 | Greene et al. | 709/203 |

\* cited by examiner

*Primary Examiner*—Lewis A Bullock, Jr.
*Assistant Examiner*—Jason Mitchell
(74) *Attorney, Agent, or Firm*—Fulbright & Jaworski L.L.P.

(57) ABSTRACT

A system and method are disclosed for history management a plurality of objects within an application, wherein each of the plurality includes at least a software method for saving the object's state and a software method for loading the object's state and a history manager function including a software method for recording an application interaction state for each user interaction with the application, wherein the application interaction state comprises the object's state for each of the plurality of objects at a time of the each user interaction with the application, wherein the user selects a desired one of the application interaction states to set the application to a desired one of the user interactions.

35 Claims, 4 Drawing Sheets

MANAGEMENT OF USER INTERACTION HISTORY WITH SOFTWARE APPLICATIONS

TECHNICAL FIELD

The present invention relates, in general, to software application functionality, and, more specifically, to managing the history of user interactions with a software application.

BACKGROUND OF THE INVENTION

The growth of the Internet has spawned a variety of industries and applications. Browser technology, the computer applications used to navigate the Internet and the World Wide Web (WWW), have become a nearly universal computer application paradigm. The ease with which users are able to navigate between various Web pages resulted in a new generation of browser-centric users. Web pages are typically formatted in hypertext markup language (HTML). HTML is a format-descriptive meta language that describes the visual formatting and layout of the Internet documents. These documents are generally delivered to users over the Internet using hypertext transfer protocol (HTTP). HTTP is an address-oriented transport protocol that utilizes uniform resource locators (URLs) to identify the locations of specific Web pages. Web browsers use these URLs to navigate between the various HTML pages that a user desires to see.

In comparison, most general computer applications, whether on the desktop or Web-based, utilize a direct and application-specific interface with the user. Therefore, users interact with various general computer applications using navigation means that are generally different from their browser experience. With the increased popularity and usability of browsers, however, many software manufacturers have modified various user interface (UI) elements of general applications to mimic the ease and familiarity of the browser experience.

One shortcoming to general computer applications that has generally escaped a browser-like UI feature is the "Back" button. Browser users are familiar with the standard browser navigation tools, such as Back, Forward, Home, Favorites, and the like. Without these tools, it is likely that users would not have as good an experience in navigating the Web as they currently enjoy. The WWW is typically well-suited to such navigation tools because of the address-oriented nature of the URL-based transport protocol, HTTP. As a user "surfs" or hypertext jumps from one page to the next, a history of the user's interactions is easily recorded and managed. The URL of each page may simply be stored in some kind of storage register or memory location. As the user desires to return to a particular Web page, he or she may either sequentially click the Back button, until the desired page is reached, or, if the user goes past the desired page, he or she may click the Forward button to return through the address list. In some browser embodiments, the user may be shown several historical URLs, or the Web page title associated with that URL, at once, allowing for random navigation by directly selecting the particular address the user desires to jump to. Similarly, if a user desires to save a particular Web page address for future direct reference, the URL for that page may be stored in a Favorites list.

In contrast, general computer applications do not typically operate on an address-based mechanism within the operation of the application itself. General computer applications usually execute sequential code or bytecode compiled from a declarative computer language, such as MACROMEDIA, INC.'s ACTIONSCRIPT™, and SUN MICROSYSTEM INC.,'s JAVASCRIPT™, that does not have a universally-specific indicator of a particular view, page, or process step in the application. Therefore, the application generally has no way for recording a particular user interaction to which the user can then return simply by clicking a Back button.

For example. MICROSOFT CORPORATION'S OUTLOOK™ email program allows interaction with email, whether incoming, outgoing, saved, sorted, and the like. While any one particular box, such as the inbox, may have a Back and Forward button to traverse the various emails in that box, those navigational tools typically work within the context of that box. Moreover, those interface elements usually work in the context of location. Therefore, if a user begins looking at the first email, then selects to view the tenth email, using the back button would only get the user to the ninth email, even though the user had yet to actually view the ninth email. Similarly, if a user views emails that have been sorted in a specific folder and then moves to view emails in the inbox, pressing the back button will not return the user to viewing the email in the specific folder.

Wizards are computer applications that are developed to step a user through a particular process. The Wizard, somewhat like a browser, displays a view screen to a user for providing some information or to request a particular action. Once the action is taken, it moves to the next view screen in the Wizard sequence. Wizards will typically have a Back button, but this Back button works only in a sequential method. Therefore, in view screen five, if the user selects the Back button, the user is "backed up" to view screen four. These navigation features in a Wizard do not necessarily operate on the basis of the user's interaction history, but merely operate on the sequence of the Wizard itself. A user desiring to go completely back to the beginning of the Wizard would need to repeatedly select the Back button in order to get there. Moreover, if, during operation of the Wizard, the user accessed another application running on the user's computer, the Wizard Back button would not take the user back to this separate application.

Another example of an attempt by computer software manufacturers to implement Browser-like navigation are large form-type applications. One example of a form-type application would be INTUIT CORPORATION's TURBOTAX™. The function of the TURBOTAX™ software is to step a user through a series of fill-in form pages in order to complete various federal income tax return forms. Recent versions of TURBOTAX™ have included not only a Wizard-like Back button, which works sequentially, but also a hypertext-coded outline of the various major steps allowing the user to hypertext jump to any portion of the fill-in form process. Again, while this navigation allows the user to jump to various places in the application, it is implemented purely through mapping of the application. The various user interactions with TURBOTAX™ are not recorded for purposes of navigation. Therefore, if a user selected to return to the deductions section, he or she would be taken to the first page of the deductions section regardless of whether or not the user had even been to that page before. While this navigation feature allows the user more flexibility in navigating the application, there is still no way to directly track the user's interactions.

Recently, computer applications have been made available to users to access over the Internet. These Web-based or on-line applications are generally accessed by the user through the container of the Web browser. The Web browser displays an HTML page, however, the HTML page contains a player or other type of application container that runs the visual representation of the Web-based application to the user.

In these types of applications, if the user were operating the Web-based application, the browser Back button would not necessarily take the user back to the preceding step of the application, but may, in fact, take the user back to the Web page that preceded the user's activation of the Web-based application. Thus, the Back button would exit the user from the application altogether.

In order to compensate for this problem with on-line applications, techniques have been developed to communicate with the browser that the user is interacting with an on-line application that is being displayed within the browser. Such features are typically implemented using a hidden Web page, referred to as an invisible frame or i-frame. When a user calls an on-line application, an HTML shell is loaded with the container on which the on-line application will be displayed. One example of such a container may be MACROMEDIA INC.'s MACROMEDIA FLASH™ PLAYER. Along with the MACROMEDIA FLASH™ PLAYER will be the i-frame. An i-frame is a browser element which is a floating frame, sub-navigational element within the browser window. Navigation that occurs within the i-frame is remembered in the browser's history mechanism. Therefore, when a user selects Back or Forward, the history information from the i-frame is used.

In the example of a MACROMEDIA FLASH™ PLAYER container, the i-frame will also includes a Small Web Format (SWF) file. SWF files are the native file format in MACROMEDIA FLASH™. The SWF file within the I-frame will be used to communicate with the main SWF file running in the MACROMEDIA FLASH™ PLAYER container. In these applications, the developer has generated state book marks which mark places in the application for use with a navigational feature. For example, a developer may place code in the application that state A is an entry screen, while state B is a processing screen, and state C is a confirmation screen. When the application is running and a user moves from the entry screen to the processing screen, the i-frame notes the change from state A to state B in a URL having query information concerning the actual state of the application. The browser history feature remembers the new URL of the processing screen, which is state B for the application. If the user were to select the Back button on the browser, the browser pulls the previous URL from its history, passes it to the i-frame, which, in turn, uses the query information from the previous URL to communicate to the main SWF file running on the MACROMEDIA FLASH™ PLAYER container and reload state A to the main SWF file. Therefore, the user is taken back to state A or the entry screen of the on-line application. While this method allows for history navigation within an on-line application, the application developers hard codes each state identifier into the application, adding a substantial amount of work and expense to the development of the application.

BRIEF SUMMARY OF THE INVENTION

Representative embodiments of the present invention are related to a system and method for managing user interaction with computer applications. Computer applications typically comprise a number of objects that operate or are displayed within the application. Computer applications that are configured according to the teachings of the present invention include objects that may have at least two computer methods: a save state method and a load state method. To interact with these objects, a history manager is also used that includes, at least, a method for saving the application state. In calling this save application state method from the history manager, the history manager calls the save state method for each of the objects in the application. The collection of each of the objects' saved states is then stored, associated with the particular user interaction that caused each of the states. If a user desires to go back to one of the previous points in the application, he or she may select the particular application state that is stored associated with that particular user interaction or application state.

In response to this Back feature being selected, the history manager calls the load state method for each of the objects, which then reload the state that was originally stored for that particular application state or that particular user interaction. By causing each object to restore the specific state, the application returns to the exact state for that particular user interaction. Maintaining a list of the state objects, state objects are each of the objects' states saved for a particular user interaction, the user may select to go back to previous interactions and then go forward to current interactions. With the ability to save these state objects, a user may also more permanently save an interaction state in a favorites-like data structure.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
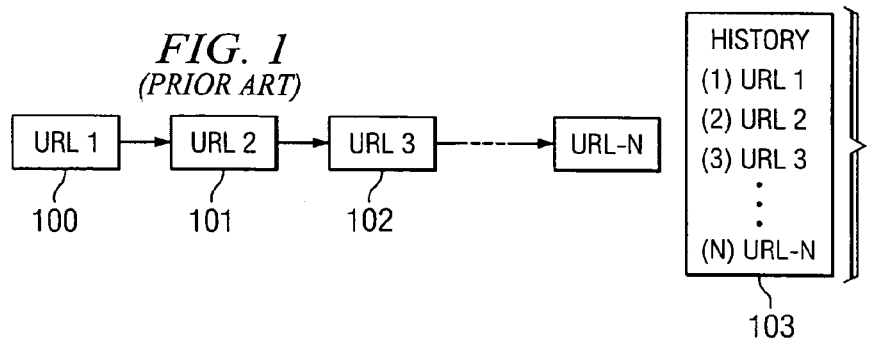
FIG. 1 is a block diagram illustrating a typical Web interaction.

FIG. 1 is a block diagram illustrating a typical Web interaction. By using a Web browser, the user may start at a first Web page, URL 1100. The user can then navigate to other Web pages, such as URL 2 101, URL 3 102, and so on. Because each Web page is designated by its URL, this address information may easily be stored in history 103. Using this history database in history 103, the user can select to go back either sequentially or randomly by using the browser's Back feature.

Figure 2A:
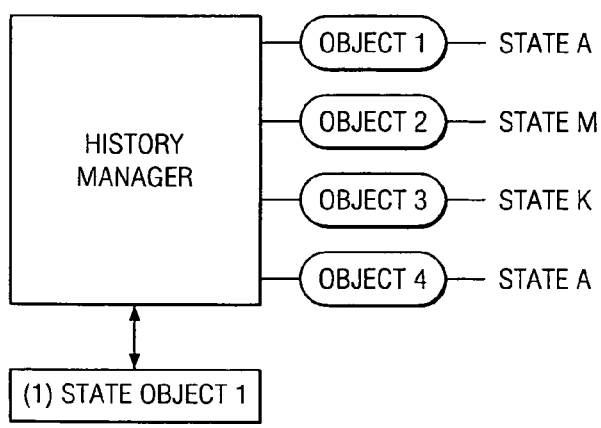
FIG. 2A is a block diagram illustrating one embodiment of the present invention.

FIG. 2A is a block diagram illustrating one embodiment of the present invention. Application 20 comprises history manager 200, history log 201, and objects 1-4. Objects 1-4 are shown in particular states. Object 1 is in state A; object 2 in state M, object 3 in state K, and object 4 in state A. When the user interacts with application 20, history manager 200 calls the save state method of objects 1-4, which causes each of the individual object states to be stored in history log 201. This application state may be stored in history log 201 as state object 1. The state object is the main object that stores the states of each of the individual application objects.

Figure 2B:
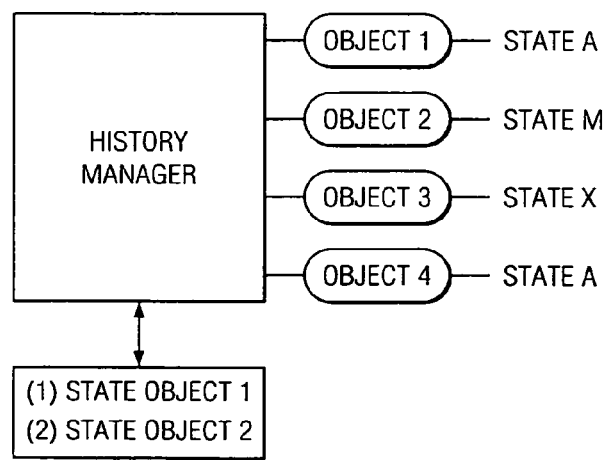
FIG. 2B is a block diagram illustrating one embodiment of the present invention after a user interaction.

FIG. 2B is a block diagram illustrating one embodiment of the present invention after a user interaction. When the user interacts again with application 20, the user interaction causes object 3 to change its state to state X. This user interaction triggers history manager 200 to call the save state method for each of objects 1-4. State object 2 is then stored in history log 201 including each of the states of objects 1-4. Various embodiments of the present invention will store each of the object states, including any object states that do not change from one user interaction to another.

Figure 2C:
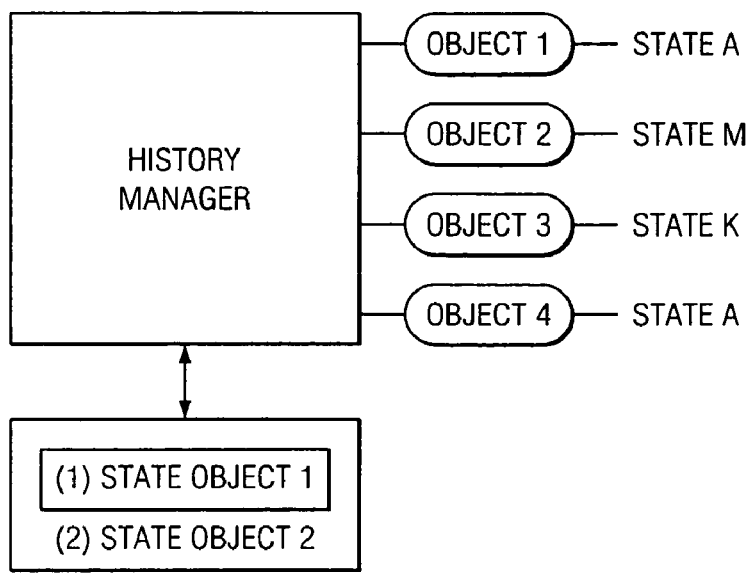
FIG. 2C is a block diagram illustrating the embodiment of the present invention described in FIGS. 2A and 2B after further user interaction.

FIG. 2C is a block diagram illustrating the embodiment of the present invention described in FIGS. 2A and 2B after further user interaction. After the user interacted with application 20 to change the state of object 3 to state X, the user, in the example shown in FIG. 2C, desires to return to the previous view screen of application 20. By activating the Back feature implemented according to the teachings of the present invention, the user selects state object 1, which triggers history manager 200 to call the load state methods of each of objects 1-4. The individual object states stored in state object 1 are then used by objects 1-4 to load up the "new" states. Thus, the "new" state of application 20 returns application 20 to the exact position when the user was previously there.

In the example described in FIGS. 2A-2C, only a single user interaction was described. It should be noted that the various embodiments of the present invention are not limited to a single, sequential interaction-history recall, similar to a "Back" or "Forward" function. If the user had made ten different interactions with application 20, for example, ten different state objects would be stored, each having the multiple individual states of the objects for that particular user interaction. When the user selects to use the history management feature, each of the ten state objects would be presented to the user for random selection to return to any of the previous user interactions. It should also be noted that the options for the ten different state objects may be presented to a user in such a visual way as to inform the user of what type of interaction is represented by that state object.

Figure 3:
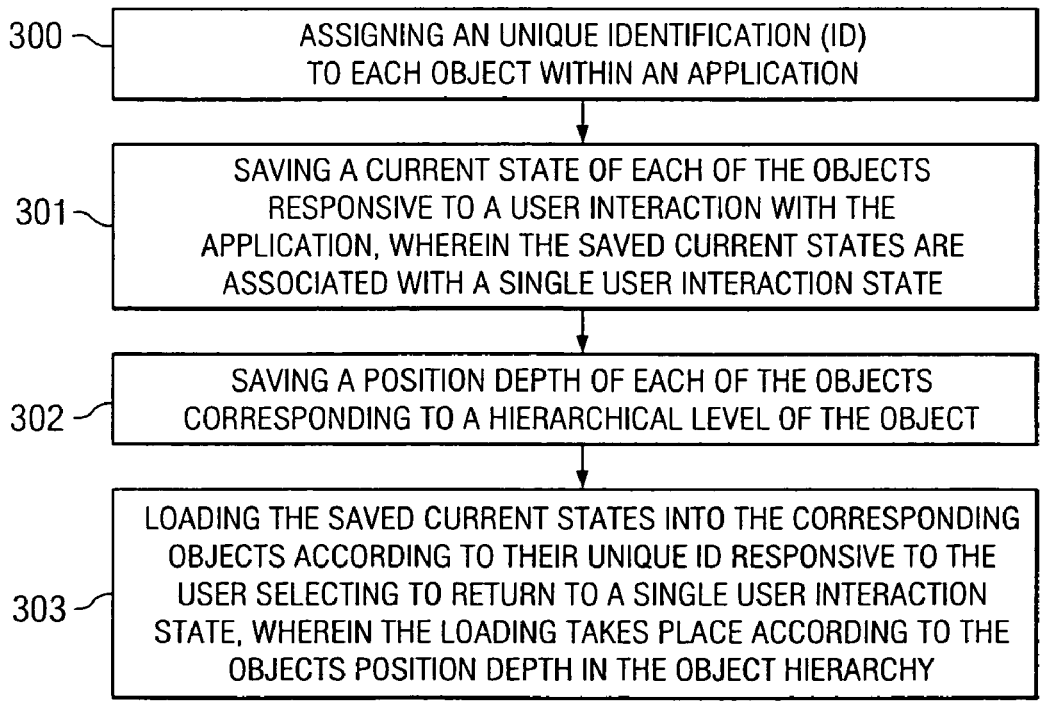
FIG. 3 is a flow chart illustrating various steps executed in implementing another embodiment of the present invention.

FIG. 3 is a flow chart illustrating various steps executed in implementing another embodiment of the present invention. In step 300, a unique identification (ID) is assigned to each object within an application. Responsive to a user interaction with the application, a current state of each of the objects is then saved in step 301, wherein the saved current states are associated with a single user interaction state. Responsive to the user selecting to return to a single user interaction state, the saved current states are loaded into the corresponding objects according to their unique ID in step 302.

Figure 4:
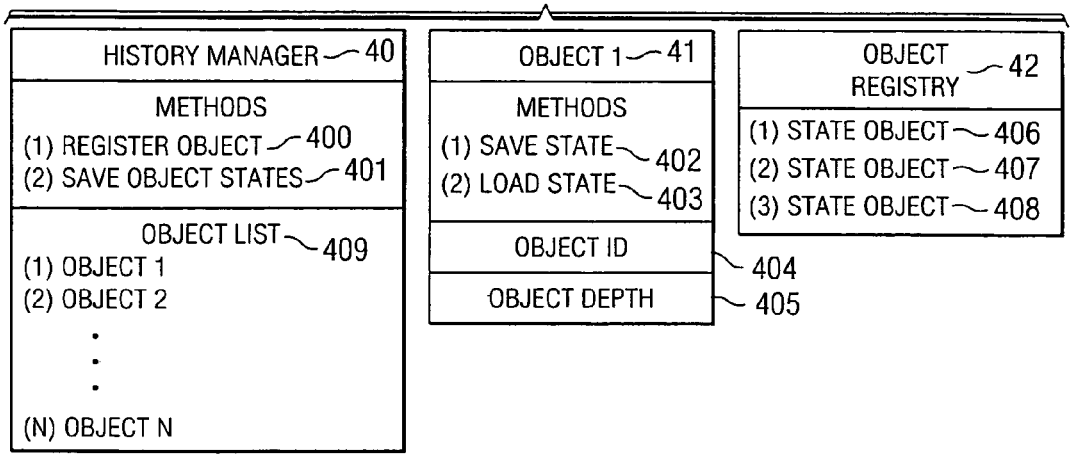
FIG. 4 is a block diagram of a history manager, object registry, and object configured according to another embodiment of the present invention.

FIG. 4 is a block diagram of history manager 40 and object 41 configured according to another embodiment of the present invention. History manager 40 is coded by the software developer to include the methods, register object 400 and save state objects 401, in its application programming interface (API). Object-1 41 is coded by the software developers to include at least two methods, save state 402 and load state 403, in its API. Save state 402 tells object 41 to save its current state. The current state is saved in object registry 42 associated with the user's interaction as a state object, such as state objects 406-408. Load state 403 tells object 41 to load that particular object's state saved in the state object that has been associated with the user interaction that the user has selected to return or jump to.

In the embodiment of the present invention depicted in FIG. 4, each object in the application that is to use the history management feature calls the method register object 400 of history manager 40. As each object is registered with history manager 40, object list 409 is created listing each of the objects, such as object-1 41, that have registered to take advantage of the history management feature. Upon calling register object 400 method, history manager 40 assigns a unique ID to that object, Object-1 41 for example, and sets that ID in object ID 404. History manager 40 also sets the particular objects depth in object depth 405. An object's depth is the hierarchical level of the object in the structure of the application. For example, the hierarchical level provides the objects relational position with regard to other objects. A relational position may be a parent relationship, a child relationship, and a sibling relationship.

When the user interacts with the application, history manager 40 calls save state objects method 401, which, in turn, calls save state method 402 of object-1 41. History manager 40 will then cycle through object list 409 calling the save state method for each of the other objects that have registered with history manager 40. In response to save state method 402, object-1 41 stores its current state in object registry 42 associated with the user's current interaction as a state object, such as state objects 406-408.

As the user continues to interact with the application, state objects continue to be saved in object registry 42. If the user desires to return to any one of those previous interactions, he or she may invoke the history management feature, which presents all of the state objects in object registry 42 for random selection by the user. When the user selects anyone of these state objects, such as state object 407, object-1 41 calls load state method 403 to retrieve and load into its "current" state, the state that had been saved and associated with the user interaction associated with state object 407. When reloading the previous "current" state, object depth 405 is used to determine which state objects to restore first. State objects are restored in hierarchical order starting with the outer most object or a parent relationship and ending with the inner most object level or the child or sibling relationship. Upon the loading of the previous state, the application again displays to the user the exact state that the application was in when the user interacted with the application at the user-selected previous point. The user may then randomly return to any of the subsequent states in the same manner, by selecting state object 408, for example.

It should be noted that the specifics described with respect to FIG. 4 are not the only ways to implement the various embodiments of the present invention. For example, in additional or alternative embodiments to the present invention object ID 404 or object depth 405 may be maintained with history manager 40.

It should further be noted that in additional or alternative embodiments to the present invention, certain objects may be designated in various development environments as objects that use history management by default. Such objects may be navigational elements such as a tab navigator or an accordion navigator. An example of such a development environment in which selected objects are registered with the history manager by default is MACROMEDIA, INC.'s FLEX™. FLEX™ is a development environment utilizing server-side code that assists in developing rich Internet applications. The FLEX™ server delivers a standards-based, declarative programming methodology and workflow along with runtime services for developing and deploying the presentation tier of rich client applications. FLEX™ utilizes MACROMEDIA FLASH™ as a container for delivering rich media applications to a client.

Figure 5:
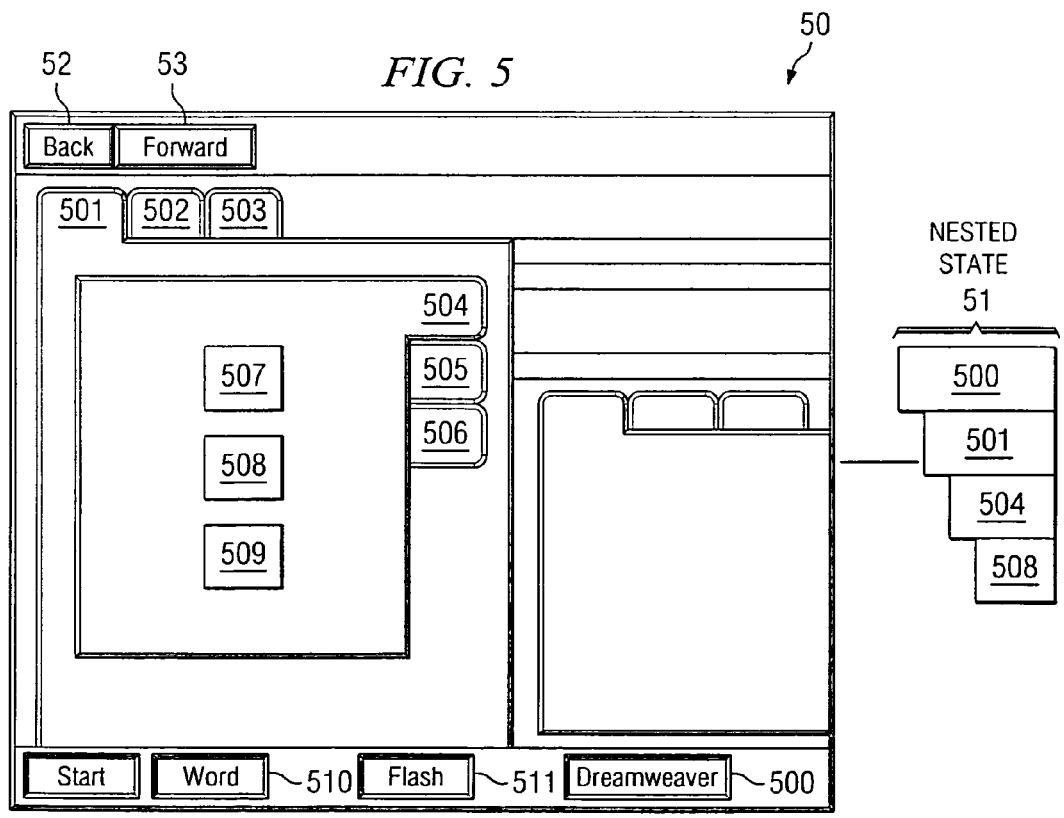
FIG. 5 is a block diagram illustrating an additional embodiment of the present invention configured to address nested object states.

FIG. 5 is a block diagram illustrating an additional embodiment of the present invention configured to address nested object states. Modern Web applications, such as application 500, indicated in the status bar of computer display 50, typically include multiple pages each possibly having interface elements with multiple tabs, such as tabs 501-503, buttons, windows, or the like, which, themselves, may also include multiple tabs, such as tabs 504-506, buttons, such as buttons 507-509, windows or the like. With such complex, three-dimensional structures, it is important to maintain the depth relationship of each object. Therefore, in additional or alternative embodiments of the present invention, a specific sequence of restoring object states is favorable to restoring the appropriate application-state corresponding to the user interaction desired for presentation.

When the user selects button 508 in application 500, the state of button 508 is changed, along with possible changes in other objects of application. For purposes of the example illustrated in FIG. 5, only a change to the state of button 508 is implemented. The object for button 508 is a child object of the window of tab 504. Tab 504 is, itself, a child object of the window associated with tab 501, which, itself is a child object of application 500. Beginning with the top-most level, button 508 is within nested state 51, application 500-tab 501-tab 504-button 508. The objects for tabs 502, 503, 505, and 506 as well as the other applications 510 and 511 each have their own objects active on computer display 50. If a haphazard sequence of restoring objects were implemented, button 509 may not end up displayed as originally displayed because a subsequent object is re-rendered on top of it. However, application 500 is an embodiment configured according to the present invention which defines a specific sequence of state restoration.

If the user subsequently desires to return to the interaction described above, the application states are loaded in a top-down sequence from the highest level to the lowest. For example, the application view page for application 50 is loaded. Next, the state of tab 501 was a "viewable" state. Therefore, the visible page is displayed corresponding to tab 501. Tabs 502 and 503 were each in a "hidden" state, for which the hidden view is displayed corresponding to tabs 502 and 503. Proceeding down the hierarchical levels, tab 504 was in a "viewable" state, such that its visible page is displayed. Tabs 505 and 506 were "hidden," such that their states are reloaded in the "hidden" states. Finally, buttons 507-509 are each rendered onto the visible page of tab 504. Button 508 had been selected by the user. Therefore, its state was restored in the "selection" state.

Figure 6:
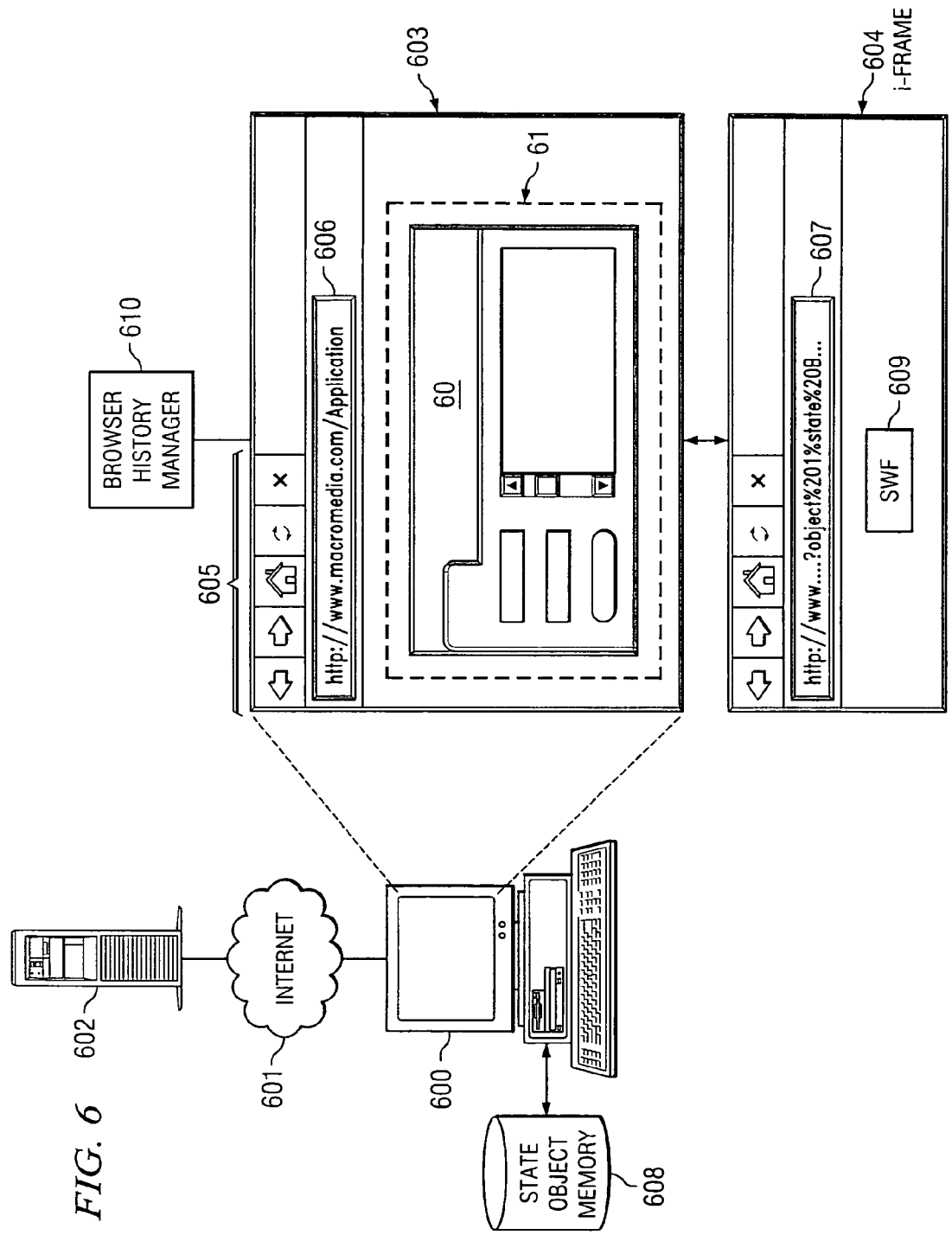
FIG. 6 is a block diagram illustrating an additional embodiment of the present invention configured in a Web application.

FIG. 6 is a block diagram illustrating an additional embodiment of the present invention configured in Web application 60. A user at computer 600 may use Internet 601 to access Web application 60 on server 602. The user accesses Web application 60 using Web browser 603. When Web application 60 is accessed, container 61 is executed to display the operations of Web application 60. Container 61 may be any type of graphical or functional players or containers, such as MACROMEDIA INC.'s MACROMEDIA FLASH™ PLAYER and the like. Web application 60, as an additional embodiment of the present invention, also initiates i-frame 604. I-frame 604 is not viewable by the user, but maintains a sub-navigational connection with browser navigation elements 605. In the example of the MACROMEDIA FLASH™ PLAYER container, SWF 609 also exists within i-frame 604. SWF 609 is able to communicate the various state information both to and from container 61, if container 61 is a MACROMEDIA FLASH™ PLAYER container.

As the user interacts with Web application 60, a state object is created using each of the present states of the objects within Web application 60. A single state object is created for each user interaction and stored in state object memory 608. The functions of Web application 60 operate to convert the single state object into a properly formatted query information string, which is then used to compiled state object URL 607. I-frame 604 communicates state object URL 607 to the browser, which stores it in browser history memory 610.

If the user desires to return to one of his or her previous interactions, he or she selects the specific URL from the browser's history feature. In response to this selection, the appropriate state object URL is retrieved from browser history memory 610, such as state object URL 607. State object URL 607 is communicated to i-frame 604, in which the state information contained within the query information string of state object URL 607 is used by SWF 609 to load the previous state into Web application 60. The display of Web application 60 is, thus, restored to the desired interaction that the user selected.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A computer readable medium storing a program for managing a history for a software application comprising:
   a plurality of objects, wherein each one of said plurality of objects includes:
      a save state method operable to save a current state of said each one of said plurality of objects; and
      a load state method operable to load a saved current state of said each one of said plurality of objects;
   a history manager function including a save application state method, wherein said save application state method calls said save state method for each of said plurality of objects and saves said current state into an interaction state object corresponding to each one of a plurality of user interactions with said software application, wherein multiple states, including a previous state, remain saved for said plurality of user's interactions with the software application;

an object depth assigned by said history manager function to each one of said plurality of objects, wherein said object depth corresponds to a position within a view hierarchy for said plurality of objects, and wherein said history manager function uses said object depth to determine an order for calling said load state method; and wherein said interaction state object corresponding to a desired one of said plurality of user interactions is selectable to set said software application to said desired one of said plurality of user interactions.

2. The history management medium of claim 1, wherein said load state method is called when said interaction state object is selected and wherein said load state uses said saved current state within said selected interaction state object.

3. The history management medium of claim 1 further comprising:
a unique identifier assigned by said history manager function to each one of said plurality of objects of the software application.

4. The history management medium of claim 1 further comprising:
an object registration method within said history manager function, wherein each one of said plurality of objects participating in said software application calls said object registration method; and
a list of registered objects within said history manager function, wherein said object registration method places a reference to each of said participating ones of said plurality of objects in said list.

5. A method for managing user interaction history in a computer application comprising:
responsive to each of a plurality of user interactions with said computer application, saving a current state and a previous state of each one of one or more objects in said computer application, wherein said saved current state and saved previous state are associated with each of said plurality of user interactions;
recording a relational position of each of said one or more objects, said relational position comprising: a parent relationship; a child relationship; and a sibling relationship; and
responsive to a user selecting to return to any one of said plurality of user interactions, loading said saved current states associated with said selected plurality of user interaction into corresponding ones of said one or more objects, wherein said loading is performed according to said relational position.

6. The method of claim 5 further comprising:
registering select ones of said one or more objects with a history manager prior to said saving; and
creating a list of said select ones registered with said history manager.

7. The method of claim 6 further comprising:
assigning a unique identification (ID) to each of said registered select ones of said one or more objects, wherein said loading uses said unique ID to determine said corresponding ones of said one or more objects.

8. The method of claim 5 further comprising:
assigning a unique identification (ID) to each of said one or more objects.

9. The method of claim 5 wherein said relational position of said parent relationship is loaded first.

10. The method of claim 5 wherein said computer application is a Web application presented in a container displayed in a Web browser.

11. The method of claim 10 further comprising:
generating a Web frame invisible to said user for communicating with at least one navigation element on said Web browser; and
establishing a communication link between said Web frame and said computer application.

12. The method of claim 11 further comprising:
responsive to said user interacting with said Web application, converting said single user interaction state into a Web-compatible query information string;
generating a state Uniform Resource Locator (URL) using said Web-compatible query information string; and
saving said state URL in a memory accessible by said Web browser.

13. The method of claim 12 further comprising:
responsive to a user selecting to return to said any one of said plurality of user interactions, retrieving said corresponding state URL from said memory;
communicating said Web-compatible query information string to said Web frame;
communicating said Web compatible query information string to said Web application to complete said loading.

14. A computer program product having a computer readable medium with computer program logic recorded thereon for tracking user interaction with a computer application, said computer program product comprising:
code for generating a unique identification (ID) for assignment to each one of one or more objects within said computer application;
code for storing a present state and a previous state of said each one of said one or more objects responsive to user interaction with said computer application, wherein said stored present state and previous state are associated with specific user interactions;
code for identifying a position depth of each of said one or more objects; and
code for loading said stored present state into said one or more objects according to said unique ID, said code for loading is executable responsive to selecting to view said specific user interaction corresponding to the present state, and wherein said code for loading is performed sequentially according to said position depth.

15. The computer program product of claim 14 wherein each of said one or more objects having an outer position of said position depth is loaded first.

16. The computer program product of claim 14 further comprising:
code for registering each of said one or more objects with said computer application prior to executing said code for generating.

17. The computer program product of claim 14 wherein said computer application is a Web application presented in a container displayed in a Web browser.

18. The computer program product of claim 17 further comprising:
code for creating an undisplayed Web frame for communicating with one or more navigation elements on said Web browser; and
code for establishing a communication link between said undisplayed Web frame and said computer application.

19. The computer program product of claim 18 further comprising:
   code for converting said single user interaction state into a Web-compatible query information string responsive to said interacting with said Web application,
   code for generating a state Uniform Resource Locator (URL) using said Web-compatible query information string; and
   code for storing said state URL in a memory accessible by said Web browser.

20. The computer program product of claim 18 further comprising:
   code for retrieving said state URL from said memory responsive to selecting to return to said single interaction state;
   code for communicating said Web-compatible query information string to said undisplayed Web frame;
   code for communicating said Web compatible query information string to said Web application to complete execution of said code for loading.

21. A system comprising:
   a computer having a storage memory and a computer display;
   a computer application received by said computer, wherein, when executed by said computer, said computer application comprises:
      a history manager, wherein, responsive to each of a plurality of user interactions with said computer application, said history manager is configured to save to said storage memory a current state and a previous state of each one of one or more objects in said computer application displayed on said computer display, wherein said saved current state and saved previous state are associated with each of said plurality of user interactions, wherein said history manager is further configured to record to said storage memory a relational position of each of said one or more objects, said relational position comprising: a parent relationship; a child relationship; and a sibling relationship, and wherein, responsive to a user selecting to return to any one of said plurality of user interactions, said history manager is further configured to load said saved current states associated with said selected plurality of user interaction from said storage memory into corresponding ones of said one or more objects, wherein said loading is performed according to said relational position.

22. The system of claim 21 wherein said history manager is further configured to:
   register select ones of said one or more objects with a history manager prior to said saving; and
   create a list of said select ones registered with said history manager.

23. The system of claim 22 wherein said history manager is further configured to assign a unique identification (ID) to each of said registered select ones of said one or more objects, wherein said loading from said storage memory uses said unique ID to determine said corresponding ones of said one or more objects.

24. The system of claim 21 wherein said history manager is further configured to assign a unique identification (ID) to each of said one or more objects.

25. The system of claim 21 wherein said relational position of said parent relationship is loaded first.

26. The system of claim 21 wherein said computer application is a Web application presented on said computer display in a container displayed in a Web browser executed by said computer.

27. The system of claim 26 wherein, responsive to execution of said computer application, said Web browser is configured to:
   generate a Web frame invisible to said user for communicating with at least one navigation element on said Web browser; and
   establish a communication link between said Web frame and said computer application.

28. The system of claim 27 wherein, responsive to said user interacting with said computer application, said history manager is further configured to:
   convert said single user interaction state into a Web-compatible query information string;
   generate a state Uniform Resource Locator (URL) using said Web-compatible query information string; and
   save said state URL in said storage memory.

29. A system comprising:
   a computer having a storage memory and a computer display;
   a computer application received by said computer, wherein, when executed by said computer, said computer application comprises:
      a history manager configured to generate a unique identification (ID) for assignment to each one of one or more objects displayed on said computer display within said computer application, wherein, responsive to user interaction with said computer application, said history manager is further configured to store in said storage memory a present state and a previous state of said each one of said one or more objects wherein said stored present state and previous state are associated with specific user interactions, said history manager further configured to identify a position depth of each of said one or more objects, and wherein, responsive to selecting to view said specific user interaction corresponding to the present state, said history manager is further configured to load said stored present state from said storage memory into said one or more objects according to said unique ID, wherein said history manager loads said stored present state sequentially according to said position depth.

30. The system of claim 29 wherein each of said one or more objects having an outer position of said position depth is loaded first.

31. The system of claim 29 wherein said history manager is further configured to register each of said one or more objects with said computer application prior to generation of said unique ID.

32. The system of claim 29 wherein said computer application is a Web application presented in a container displayed in a Web browser.

33. The system of claim 32 wherein, responsive to execution of said computer application, said Web browser is configured to:
   create an undisplayed Web frame for communicating with one or more navigation elements on said Web browser; and
   establish a communication link between said undisplayed Web frame and said computer application.

34. The system o claim 33 wherein said history manager is further configured to:

convert said single user interaction state into a Web-compatible query information string responsive to said interacting with said Web application;

generate a state Uniform Resource Locator (URL) using said Web-compatible query information string; and store said state URL in said storage memory.

35. The system of claim 33 wherein said history manager is further configured to:

retrieve said state URL from said storage memory responsible to selecting to return to said single interaction state;

communicate said Web-compatible query information string to said undisplayed Web frame; and communicate said Web compatible query information string to said Web application to complete execution of said code for loading.

* * * * *